US012471690B2

(12) United States Patent
Griffin, Sr.

(10) Patent No.: US 12,471,690 B2
(45) Date of Patent: Nov. 18, 2025

(54) CLEANING ASSEMBLY FOR HAIR CUTTING DEVICES

(71) Applicant: PK Griffin Global LLC, Greensboro, NC (US)

(72) Inventor: Pierre Lamont Griffin, Sr., Greensboro, NC (US)

(73) Assignee: PK Griffin Global LLC, Greensboro, NC (US)

(*) Notice: Subject to any disclaimer, the term of this patent is extended or adjusted under 35 U.S.C. 154(b) by 0 days.

(21) Appl. No.: 18/969,557

(22) Filed: Dec. 5, 2024

(65) Prior Publication Data

US 2025/0185780 A1 Jun. 12, 2025

Related U.S. Application Data

(60) Provisional application No. 63/606,704, filed on Dec. 6, 2023.

(51) Int. Cl.

| | |
|---|---|
| ***A45D 27/46*** | (2006.01) |
| ***A46B 13/04*** | (2006.01) |
| ***B08B 1/12*** | (2024.01) |
| ***B08B 1/32*** | (2024.01) |
| ***B08B 13/00*** | (2006.01) |
| *B26B 19/20* | (2006.01) |

(52) U.S. Cl.

CPC .............. *A45D 27/46* (2013.01); *A46B 13/04* (2013.01); *B08B 1/12* (2024.01); *B08B 1/32* (2024.01); *B08B 13/00* (2013.01); *A46B 2200/3073* (2013.01); *B26B 19/20* (2013.01)

(58) Field of Classification Search

None

See application file for complete search history.

(56) References Cited

U.S. PATENT DOCUMENTS

| | | | |
|---|---|---|---|
| 6,189,215 | B1 | 2/2001 | Beerwerth et al. |
| 2022/0143852 | A1 | 5/2022 | Mengerink et al. |
| 2022/0305685 | A1 | 9/2022 | Lap et al. |

FOREIGN PATENT DOCUMENTS

| | | | |
|---|---|---|---|
| CN | 212706888 | U | 3/2021 |
| JP | H11192389 | A | 7/1999 |
| JP | 2007330709 | A | 12/2007 |
| JP | 2008099723 | A | 5/2008 |

OTHER PUBLICATIONS

Google Patents translation of CN212706888U (Year: 2005).*
Google Patents translation of JP2007330709A (Year: 2025).*
Google Patents translation of JP2008099723A (Year: 2025).*
International Search Report and Written Opinion, PCT/US24/58587, Apr. 3, 2025, 11 pages.

* cited by examiner

*Primary Examiner* — Eric W Golightly
(74) *Attorney, Agent, or Firm* — Stanek Lemon Crouse & Meeks, PA

(57) ABSTRACT

An apparatus for cleaning and disinfecting a blade assembly of a hair clipper is provided. The apparatus includes a housing configured to facilitate insertion of at least the blade assembly of the hair clipper therein, first and second cleaning members disposed within the housing and defining a receiving space therebetween to receive the blade assembly of the hair clipper and a disinfectant dispensing assembly having a set of nozzles configured to dispense a disinfectant solution towards the receiving space and on the blade assembly. Further, methods of cleaning and disinfecting the blade assembly using the apparatus are also disclosed.

16 Claims, 5 Drawing Sheets

CLEANING ASSEMBLY FOR HAIR CUTTING DEVICES

RELATED APPLICATION DATA

This application claims priority to and the benefit of U.S. Provisional Application No. 63/606,704, filed Dec. 6, 2023, the content of which is hereby incorporated herein by reference in its entirety.

FIELD

The present disclosure relates to the domain of cleaning and/or disinfecting grooming products. Particularly, the present disclosure relates to an apparatus and a method for cleaning and/or disinfecting a blade assembly of a hair clipper device.

BACKGROUND

Electric hair-cutting devices, such as hair clippers, generally have a housing containing a motor, and the housing is designed such that the hair clipper may be hand-held during use. At a hair-cutting end of the hair clipper, a blade assembly comprising a plurality of teeth is provided for shearing or cutting/clipping hair of preselected or variable length.

After each use of the hair clipper, the process of cleaning and disinfecting the hair clipper is of the utmost importance as the safety and health of the user and/or subject whose hair is cut depends on how thoroughly the cleaning and disinfection of at least the blade assembly of the hair clipper is performed. For instance, in barbershops and beauty salons where a conventional hair clipper is used to clip hair of many clients, harmful germs, disease causing bacteria and life-threatening pathogens may transfer from one client to another while receiving haircut services. Currently, Cosmetology Board and the Barber Board regulations require thorough cleaning and disinfection of the hair clippers to be performed after use on each client.

Manually cleaning and disinfecting the hair clippers is a time consuming and very tedious process. To manually clean and disinfect hair clippers, the barber typically uses a brush to remove hair and scalp debris from the blade assembly of the hair clipper by brushing both the upper and lower sides of the blade assembly until teeth of the blade assembly are visibly clear of any hair, followed by spraying both sides of the blade assembly with a disinfectant solution. Usually, the hair clipper needs a subsequent cleaning to be cleaned thoroughly. This entire process of cleaning and disinfecting the hair clipper is a time-consuming process, and often done improperly, and in some cases fully neglected.

In the rush of a busy day, a barber may make an effort to serve all of the clients that one possibly can. In some cases, the barber does not properly clean and disinfect the hair clippers, and in many cases, cleaning and disinfection is completely neglected. Using unsanitary clippers can be a direct transmission point for bacteria, fungus, and other potentially deadly pathogens.

SUMMARY

One or more shortcomings of the prior art are overcome by the system and method as claimed, and additional advantages are provided through the provision of the system and method as described in the present disclosure. Additional features and advantages are realized through the techniques of the present disclosure. Other embodiments and aspects of the disclosure are described in detail herein and are considered a part of the disclosure.

Pursuant to an aspect, in an embodiment, a hair clipper cleaning and disinfecting apparatus is disclosed. The apparatus includes a housing configured to receive and/or at least partially enclose a blade assembly of a hair clipper during an automated cleaning and/or disinfecting operation. The blade assembly includes a plurality of teeth for shearing hair of a preselected or variable length. The apparatus further incudes a cleaning member assembly positioned within the housing. The cleaning member assembly includes a first cleaning member and a second cleaning member arranged to define a receiving space between them within the housing. The receiving space is configured to accommodate a portion of the blade assembly. The first and second cleaning members are configured to move to contact opposing surfaces of the blade assembly within the receiving space to dislodge contaminants during the automated cleaning and/or disinfecting operation. The apparatus furthermore includes a cleaning and/or disinfectant dispensing assembly (hereinafter referred to as a "disinfectant dispensing assembly") positioned within the housing. The disinfectant dispensing assembly includes a first nozzle configured to direct a disinfectant solution into the receiving space from a first direction, and a second nozzle configured to direct the disinfectant solution into the receiving space from a second direction that is different from the first direction. The disinfectant dispensing assembly further includes a reservoir in fluid communication with the first and second nozzles and the reservoir is configured to store the cleaning and/or disinfectant solution. Further, the apparatus includes a control unit operatively coupled to the cleaning member assembly and the disinfectant dispensing assembly. The control unit is configured to control operations of the cleaning member assembly and the disinfectant dispensing assembly, including selectively releasing the disinfectant solution through the first and second nozzles and coordinating timing and movement of the cleaning member assembly.

In another non-limiting embodiment of the present disclosure, the first cleaning member is positioned to contact an upper surface of the blade assembly when the blade assembly is received within the receiving space defined by the first and second cleaning members. Further, the second cleaning member is positioned to contact a lower surface of the blade assembly when the blade assembly is received within the receiving space. The first cleaning member and the second cleaning member are configured to dislodge contaminants from the respective upper and lower surfaces of the blade assembly during the automated cleaning and disinfecting operation.

In another non-limiting embodiment of the present disclosure, when the blade assembly is received within the receiving space, the first nozzle is configured to direct the disinfectant solution onto the upper surface of the blade assembly, and the second nozzle configured to direct the disinfectant solution onto the lower surface of the blade assembly.

In another non-limiting embodiment of the present disclosure, when the blade assembly is received within the receiving space, the first nozzle is positioned above the blade assembly, and the second nozzle is positioned below the blade assembly.

In another non-limiting embodiment of the present disclosure, the control unit is configured to perform a cleaning and disinfecting sequence. The cleaning and disinfecting sequence includes cause activation of the cleaning member assembly for a first interval to dislodge contaminants from the blade assembly, and cause release of the disinfectant solution through the first and second nozzles onto the upper surface and the lower surface of the blade assembly following the first interval. The cleaning and disinfecting sequence further includes cause continued operation of the cleaning member assembly for a second interval to further distribute the disinfectant solution across the upper and lower surfaces of the blade assembly. The cleaning and disinfecting sequence furthermore includes cause cessation of both the cleaning member assembly and the disinfectant dispensing assembly upon completion of the second interval.

In another non-limiting embodiment of the present disclosure, the first interval ranges from 3 to 10 seconds, and the second interval ranges from 3 to 10 seconds.

In another non-limiting embodiment of the present disclosure, the control unit is configured to receive a sensor input from one or more sensors positioned to detect levels and types of contaminants on the blade assembly, analyze the sensor input to assess a degree of contamination present on the blade assembly surfaces, dynamically adjust a duration of the first interval for an operation of the cleaning member assembly based on the degree of contamination, determine and control a volume of disinfectant solution dispensed through the first and second nozzles based on the type and degree of contaminants, and adjust a duration of the second interval for an operation of the cleaning member assembly based on the type and degree of contaminants and the volume of disinfectant solution across the upper and lower surfaces of the blade assembly.

In another non-limiting embodiment of the present disclosure, the first cleaning member and the second cleaning member are configured to move toward one another upon receiving the blade assembly within the receiving space, such that each cleaning member applies pressure against respective upper and lower surfaces of the blade assembly.

In another non-limiting embodiment of the present disclosure, the control unit is configured to receive a user input, by actuation of a button, for cleaning and disinfecting the blade assembly of the hair clipper. Upon receiving the user input, the control unit is configured to transmit a first signal to a motor for rotating the first cleaning member and the second cleaning member for cleaning the blade assembly of the hair clipper, and dispense the disinfectant solution, by the first and second nozzles, to disinfect the blade assembly of the hair clipper.

In another non-limiting embodiment of the present disclosure, the control unit is configured to sequentially rotate the first and second cleaning members and dispense the disinfectant solution from the first and second nozzles.

In another non-limiting embodiment of the present disclosure, at least one of the first cleaning member or the second cleaning member is a rotatable brush.

In another non-limiting embodiment of the present disclosure, the first and second cleaning members are rotatable brushes.

In another non-limiting embodiment of the present disclosure, the apparatus further includes a light emitting element configured to provide a visual notification of an ongoing cleaning and disinfection operation.

In another non-limiting embodiment of the present disclosure, the apparatus further includes an ultraviolet light source positioned within the housing and configured to emit UV light to disinfect interior surfaces of the apparatus.

In another non-limiting embodiment of the present disclosure, the ultraviolet light source is operatively coupled to the control unit. The control unit is being configured to activate the ultraviolet light source upon completion of the cleaning and disinfecting operation and removal of the hair clipper from the apparatus.

In another non-limiting embodiment of the present disclosure, the apparatus further includes a sensor positioned on the housing and configured to detect insertion of at least the blade assembly of the hair clipper into the housing. The control unit is communicatively coupled to the sensor and configured to initiate one or more cleaning operations upon receiving an input signal from the sensor.

In another non-limiting embodiment of the present disclosure, the first cleaning member is configured to rotate in a direction opposite to a rotation direction of the second cleaning member.

Pursuant to another aspect, in an embodiment, a method of cleaning and disinfecting a blade assembly of a hair clipper using a cleaning and disinfecting apparatus is disclosed. The method includes initiating operation of the apparatus upon activation, wherein when the blade assembly is positioned within a receiving space defined between a first cleaning member and a second cleaning member of the cleaning and disinfecting apparatus. The first and second cleaning members contact respective upper and lower surfaces of the blade assembly. The method further includes rotating the first and second cleaning members for a first interval to dislodge contaminants from the upper and lower surfaces of the blade assembly, and dispensing a disinfectant solution onto the blade assembly through a first nozzle positioned to direct the disinfectant solution onto the upper surface of the blade assembly and a second nozzle positioned to direct the disinfectant solution onto the lower surface of the blade assembly following the first interval. The method furthermore includes continuing movement of the first and second cleaning members for a second interval to distribute the disinfectant solution across the upper and lower surfaces of the blade assembly. Further, the method includes ceasing operation of the first and second cleaning members and the disinfectant dispensing assembly upon completion of the second interval.

In another non-limiting embodiment of the present disclosure, when the blade assembly is positioned within the receiving space, the first and second cleaning members move toward one another to close on the blade assembly, contacting respective upper and lower surfaces of the blade assembly.

Pursuant to yet another aspect, in an embodiment, a system for cleaning and disinfecting a blade assembly of a hair clipper is disclosed. The system includes a housing configured to at least partially enclose the blade assembly during a cleaning and disinfecting sequence. The system further includes a cleaning member assembly within the housing. The cleaning member assembly includes a first cleaning member and a second cleaning member. The first and second cleaning members are arranged to define a receiving space configured to accept a portion of the blade assembly and to contact opposing surfaces of the blade assembly to dislodge contaminants. The system furthermore includes a disinfectant dispensing assembly within the housing. The disinfectant dispensing assembly includes a first nozzle configured to deliver a disinfectant solution from a first direction into the receiving space, and a second nozzle configured to deliver the disinfectant solution from a second, different direction into the receiving space. The disinfectant dispensing assembly further includes a reservoir in fluid communication with the first and second nozzles. The reservoir is configured to store the disinfectant solution. Further, the system includes a control unit operatively connected to the cleaning member assembly and the disinfectant dispensing assembly. The control unit is configured to manage selective release of the disinfectant solution through the first and second nozzles and coordinate movement of the first and second cleaning members to contact the blade assembly surfaces.

In accordance with the present disclosure, the apparatus and the system of the present disclosure are automatic hands-free apparatus and system for thoroughly cleaning and/or disinfecting the hair clipper, and in some cases, in about 10 seconds. Further, the apparatus, the system and the method of the present disclosure aid in preventing the spread of disease-causing pathogens such as bacteria and fungi which cause ringworm, folliculitis and several other skin infections many of which cause permanent damage to the skin, and preventing the spread of deadly viral blood borne pathogens which are the source of HIV, MRSA and Hepatitis B and C.

In some embodiments, the automatic hands-free apparatus and system can be controlled at the apparatus level or can be managed through a remote control device, both including time-controlled cleaning and disinfection and/or automatic shut off.

Accordingly, the apparatus, the system, and the method of the present disclosure automates the cleaning and disinfecting process and eliminates the time and manual effort used for thorough and proper cleaning. Also, the cleaning and disinfecting sequence exceeds Barber and Cosmetology Health and Safety regulations, ensuring legal compliance and peace of mind for professionals and their clients.

It is to be understood that the aspects and embodiments of the present disclosure described above may be used in any combination with each other. Several of the aspects and embodiments may be combined to form a further embodiment of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF FIGURES

The novel features and characteristics of the present disclosure are generally set forth in the description. The present disclosure itself, however, as well as a preferred mode of use, further objectives, and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements.

Figure 1:
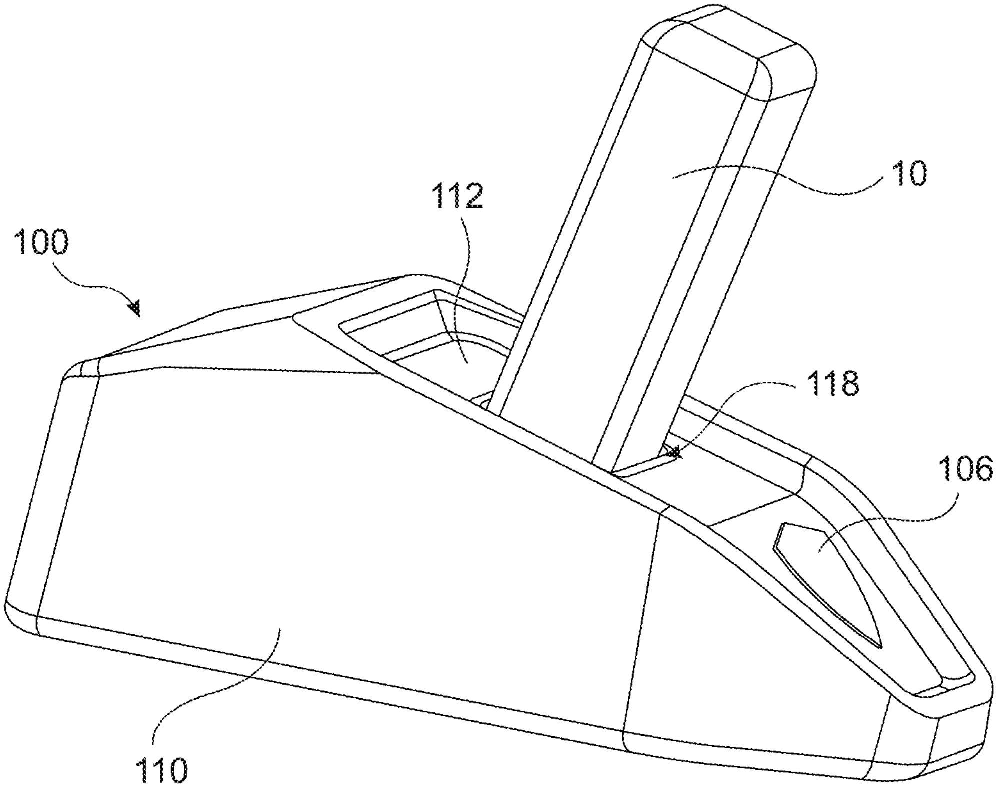
FIG. 1 is a perspective view of a hair clipper cleaning and disinfecting apparatus and a hair clipper, a portion of which is inserted into the hair clipper cleaning and disinfecting apparatus, in accordance with an embodiment of the present disclosure.

Skilled artisans will appreciate that elements in the drawings are illustrated for simplicity and have not necessarily been drawn to scale. For example, the dimensions of some of the elements in the drawings may be exaggerated relative to other elements to help to improve understanding of embodiments of the present disclosure.

DETAILED DESCRIPTION

While the present disclosure is susceptible to various modifications and alternative forms, specific embodiments thereof have been shown by way of example in the figures and will be described in greater detail below. It should be understood, however, that it is not intended to limit the present disclosure to the particular forms disclosed, but on the contrary, the present disclosure is intended to cover all modifications, equivalents, and alternatives falling within the scope of the present disclosure as defined by the appended claims.

Moreover, the drawings are showing only those specific details that are pertinent to understanding the embodiments of the present disclosure so as not to obscure the disclosure with details that will be readily apparent to those of ordinary skill in the art having benefit of the description herein.

Unless otherwise defined, all technical and scientific terms used herein have the same meaning as commonly understood by one of ordinary skill in the art to which this invention pertains. The terminology used in the description of the invention herein is for the purpose of describing embodiments only and is not intended to be limiting of the invention. As used in the description of the invention and the claims set forth herein, the singular forms "a," "an," and "the" are intended to include the plural forms as well, unless the context clearly indicates otherwise. As used herein, the term "and/or" includes all combinations of one or more of the associated listed items.

The term "comprising," which is used interchangeably with "including," "containing," or "characterized by," is inclusive or open-ended language and does not exclude additional, unrecited elements or method steps. The phrase "consisting of" excludes any element, step, or ingredient not specified in the claim. The phrase "consisting essentially of" limits the scope of a claim to the specified materials or steps and those that do not materially affect the basic and novel characteristics of the claimed invention. The present disclosure contemplates embodiments of the inventive concept corresponding to the scope of each of these phrases. Thus, various embodiments of the presently disclosed compositions and methods may "comprise," "consist" or "consist essentially of" the components or steps disclosed herein.

In the present disclosure, the term "exemplary" is used herein to mean "serving as an example, instance, or illustration." Any embodiment or implementation of the present subject matter described herein as "exemplary" is not necessarily to be construed as preferred or advantageous over other embodiments.

The terms like "at least one" and "one or more" may be used interchangeably or in combination throughout the description.

Spatially relative terms, such as “under”, “below”, “lower”, “over”, “upper”, “top”, “bottom” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

Herein, the terms “attached”, “connected”, “interconnected”, “contacting”, “mounted”, “coupled” and the like can mean either direct or indirect attachment or contact between elements, unless stated otherwise.

Embodiments of the present inventive concept concern a hair clipper cleaning and/or disinfecting apparatus, a system and a method for cleaning and/or disinfecting a blade assembly of a hair clipper. Thus, in an aspect, a hair clipper cleaning and disinfecting apparatus is disclosed. The apparatus includes a housing configured to receive and at least partially enclose a blade assembly of a hair clipper during an automated cleaning and disinfecting operation. The blade assembly includes a plurality of teeth for shearing hair of preselected or variable length. The apparatus further includes a cleaning member assembly positioned within the housing. The cleaning member assembly includes a first cleaning member and a second cleaning member arranged to define a receiving space between them within the housing. The receiving space is configured to accommodate a portion of the blade assembly. The first and second cleaning members are configured to move to contact opposing surfaces of the blade assembly within the receiving space to dislodge contaminants during the automated cleaning and disinfecting operation. The apparatus furthermore includes a cleaning and/or disinfectant dispensing assembly positioned within the housing. It should be noted that the assembly of the present inventive concept can “clean” hair clippers and also “disinfect” hair clippers. “Clean” or “cleaning,” as used herein, refers to the ability to perform or aid in soil (e.g., oil, skin, dirt, dust, protein, odor, etc.) removal, microbial population reduction, or a combination thereof, “Disinfect” refers to the ability to destroy, neutralize or inhibit the growth of disease-carrying microorganisms. Ideally, it is desired to clean and disinfect the hair clippers; however, either or both functions simultaneously or sequentially may be performed by the apparatus of the present inventive concept. Therefore, for simplicity, the cleaning and/or disinfectant dispensing assembly will be referred to as the disinfectant dispensing assembly.

The disinfectant dispensing assembly includes a first nozzle configured to direct a disinfectant solution into the receiving space from a first direction, and a second nozzle configured to direct the disinfectant solution into the receiving space from a second direction that is different from the first direction. The disinfectant dispensing assembly further includes a reservoir in fluid communication with the first and second nozzles and the reservoir is configured to store the disinfectant solution. Further, the apparatus includes a control unit operatively coupled to the cleaning member assembly and the disinfectant dispensing assembly. The control unit is configured to control operations of the cleaning member assembly and the disinfectant dispensing assembly, including selectively releasing the disinfectant solution through the first and second nozzles and coordinating timing and movement of the cleaning member assembly.

The first cleaning member is positioned to contact an upper surface of the blade assembly when the blade assembly is received within the receiving space defined by the first and second cleaning members. Further, the second cleaning member is positioned to contact a lower surface of the blade assembly when the blade assembly is received within the receiving space. The first cleaning member and the second cleaning member are configured to dislodge contaminants from the respective upper and lower surfaces of the blade assembly during the automated cleaning and disinfecting operation. When the blade assembly is received within the receiving space, the first nozzle is configured to direct the disinfectant solution onto the upper surface of the blade assembly, and the second nozzle configured to direct the disinfectant solution onto the lower surface of the blade assembly. Further, when the blade assembly is received within the receiving space, the first nozzle is positioned above the blade assembly, and the second nozzle is positioned below the blade assembly. Further, the first cleaning member and the second cleaning member are configured to move toward one another upon receiving the blade assembly within the receiving space, such that each cleaning member applies pressure against respective upper and lower surfaces of the blade assembly. In an embodiment, at least one of the first cleaning member or the second cleaning member is a rotatable brush. In another embodiment, the first and second cleaning members are rotatable brushes. The first cleaning member is configured to rotate in a direction opposite to a rotation direction of the second cleaning member.

In some embodiments, the control unit is configured to perform a cleaning and disinfecting sequence. The cleaning and disinfecting sequence includes cause activation of the cleaning member assembly for a first interval to dislodge contaminants from the blade assembly, and cause release of the disinfectant solution through the first and second nozzles onto the upper surface and the lower surface of the blade assembly following the first interval. The cleaning and disinfecting sequence further includes cause continued operation of the cleaning member assembly for a second interval to further distribute the disinfectant solution across the upper and lower surfaces of the blade assembly. The cleaning and disinfecting sequence furthermore includes cause cessation of both the cleaning member assembly and the disinfectant dispensing assembly upon completion of the second interval. The first interval ranges from about 3 to 10 seconds, and the second interval ranges from about 3 to 10 seconds. However, the either time interval can be adjusted to range from any time period from about 3 seconds to 120 seconds, or 3 seconds to 60 seconds. In other embodiments, the control unit is configured to receive a sensor input from one or more sensors positioned to detect levels and types of contaminants on the blade assembly, analyze the sensor input to assess a degree of contamination present on the blade assembly surfaces, dynamically adjust a duration of the first interval for an operation of the cleaning member assembly based on the degree of contamination, determine and control a volume of disinfectant solution dispensed through the first and second nozzles based on the type and degree of contaminants, and adjust a duration of the second interval for an operation of the cleaning member assembly based on the type and degree of contaminants and the volume of disinfectant solution across the upper and lower surfaces of the blade assembly.

In one embodiment, the control unit is configured to receive a user input, by actuation of a button, for cleaning and disinfecting the blade assembly of the hair clipper. Upon receiving the user input, the control unit is configured to transmit a first signal to a motor for rotating the first cleaning member and the second cleaning member for cleaning the blade assembly of the hair clipper, and dispense the disinfectant solution, by the first and second nozzles, to disinfect the blade assembly of the hair clipper. In another embodiment, the apparatus further includes a sensor positioned on the housing and configured to detect insertion of at least the blade assembly of the hair clipper into the housing. The control unit is communicatively coupled to the sensor and configured to initiate one or more cleaning operations upon receiving an input signal from the sensor. The control unit is configured to sequentially rotate the first and second cleaning members and dispense the disinfectant solution from the first and second nozzles.

The apparatus further includes a light emitting element configured to provide a visual notification of an ongoing cleaning and disinfection operation. The apparatus furthermore includes an ultraviolet light source positioned within the housing and configured to emit UV light to disinfect interior surfaces of the apparatus. The ultraviolet light source is operatively coupled to the control unit. The control unit is being configured to activate the ultraviolet light source upon completion of the cleaning and disinfecting operation and removal of the hair clipper from the apparatus.

Pursuant to another aspect, in an embodiment, a method of cleaning and disinfecting a blade assembly of a hair clipper using a cleaning and disinfecting apparatus is disclosed. The method includes initiating operation of the apparatus upon activation, wherein when the blade assembly is positioned within a receiving space defined between a first cleaning member and a second cleaning member of the cleaning and disinfecting apparatus. The first and second cleaning members contact respective upper and lower surfaces of the blade assembly. The method further includes rotating the first and second cleaning members for a first interval to dislodge contaminants from the upper and lower surfaces of the blade assembly, and dispensing a disinfectant solution onto the blade assembly through a first nozzle positioned to direct the disinfectant solution onto the upper surface of the blade assembly and a second nozzle positioned to direct the disinfectant solution onto the lower surface of the blade assembly following the first interval. The method furthermore includes continuing movement of the first and second cleaning members for a second interval to distribute the disinfectant solution across the upper and lower surfaces of the blade assembly. Further, the method includes ceasing operation of the first and second cleaning members and the disinfectant dispensing assembly upon completion of the second interval. When the blade assembly is positioned within the receiving space, the first and second cleaning members move toward one another to close on the blade assembly, contacting respective upper and lower surfaces of the blade assembly.

Pursuant to yet another aspect, in an embodiment, a system for cleaning and disinfecting a blade assembly of a hair clipper is disclosed. The system includes a housing configured to at least partially enclose the blade assembly during a cleaning and disinfecting sequence. The system further includes a cleaning member assembly within the housing. The cleaning member assembly includes a first cleaning member and a second cleaning member. The first and second cleaning members are arranged to define a receiving space configured to accept a portion of the blade assembly and to contact opposing surfaces of the blade assembly to dislodge contaminants. The system further includes a disinfectant dispensing assembly within the housing. The disinfectant dispensing assembly includes a first nozzle configured to deliver a disinfectant solution from a first direction into the receiving space, and a second nozzle configured to deliver the disinfectant solution from a second, different direction into the receiving space. The disinfectant dispensing assembly further includes a reservoir in fluid communication with the first and second nozzles. The reservoir is configured to store the disinfectant solution. Further, the system includes a control unit operatively connected to the cleaning member assembly and the disinfectant dispensing assembly. The control unit is configured to manage selective release of the disinfectant solution through the first and second nozzles and coordinate movement of the first and second cleaning members to contact the blade assembly surfaces.

According to still another embodiment, the present disclosure provides kits including the cleaning assembly, apparatus, or system described herein, instructions for use thereof, which instructions may be written, quick response (QR) code, link, or other digital reference thereto, and optionally, cleaning and/or disinfecting solution and/or a hair cutting device and/or a remote control device. The hair cutting device may be a device that is designed to fit complementary to the cleaning assembly in a form fitting fashion. That is, the cleaning assembly is designed specifically to custom fit a specific hair cutting device. However, in some embodiments, the kit excludes a hair cutting device yet is designed to house a hair cutting device designed specifically to fit and accompany the cleaning assembly or a standard hair cutting device. That is, in some other embodiments, the cleaning assembly is designed to fit a conventional hair cutting device.

Reference will now be made to the exemplary embodiments of the present disclosure, as illustrated in the accompanying drawings. Wherever possible same numerals will be used to refer to the same or like parts.

Embodiments of the present disclosure are described in the following paragraphs with reference to FIGS. 1 to 5. In FIGS. 1 to 5, the same element or elements which have same functions are indicated by the same reference signs.

Figure 3:
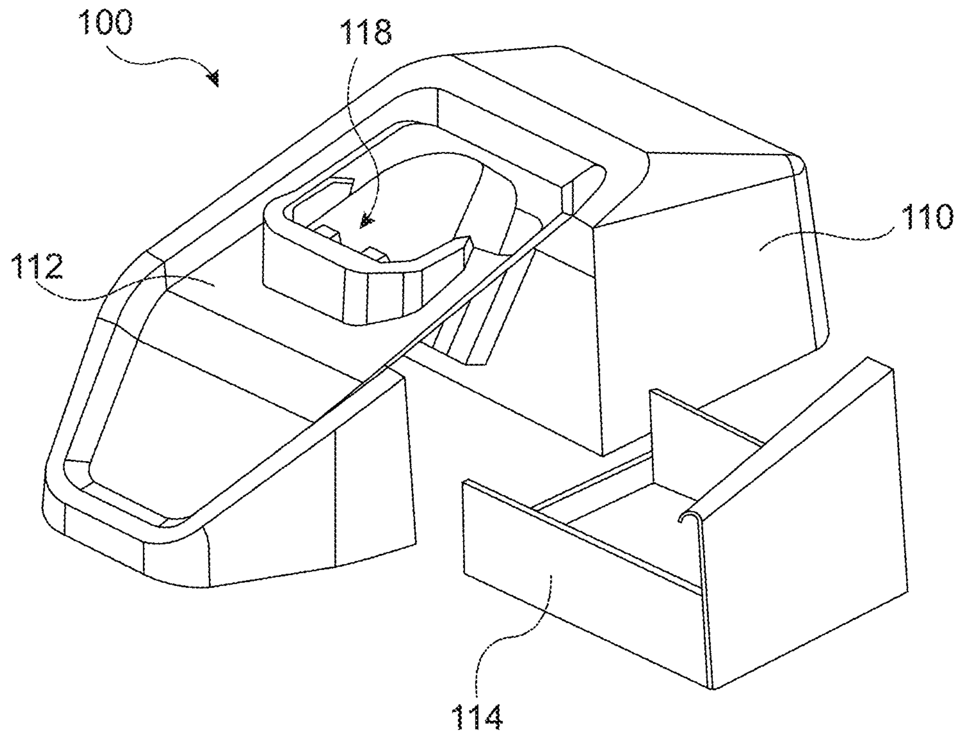
FIG. 3 is an exploded view of a housing of the hair clipper cleaning and disinfecting apparatus, in accordance with an embodiment of the present disclosure.

Referring to FIG. 1, a hair clipper cleaning and disinfecting apparatus 100 (hereinafter referred to as the "apparatus 10") configured for performing a cleaning and disinfection operation of a blade assembly (not visible) of a hair clipper 10 is illustrated. The blade assembly may be provided at one end portion of the hair clipper 10. The apparatus 100 includes a housing 110 that is configured to receive and at least partially enclose the blade assembly of the hair clipper 10 during an automated cleaning and disinfecting operation on the blade assembly of the hair clipper 10. As shown in FIG. 3, the housing 110 may define an opening 118 in a body portion 112 thereof. The opening 118 is configured to facilitate insertion of at least the blade assembly of the hair clipper 10 in the housing 110. The blade assembly of the hair clipper 10 may include a plurality of teeth for shearing hair of preselected or variable length. In an embodiment, the opening 118 may facilitate insertion of at least the plurality of teeth of the hair clipper 10 in the housing 110.

The housing 110 may be made of durable plastic that securely holds components/assemblies of the apparatus 100 in place, withstands exposure to cleaning agents, and accommodates hair clipper of varying sizes and blade assembly. The housing 110 may include rubber posts (not shown) on an undersurface thereof to provide a stable foundation for the apparatus 100 as well as reduce noise and absorb vibration. In an exemplary embodiment, the apparatus 100 includes four rubber stability posts positioned at each corner of a base of the housing 110.

Figure 4:
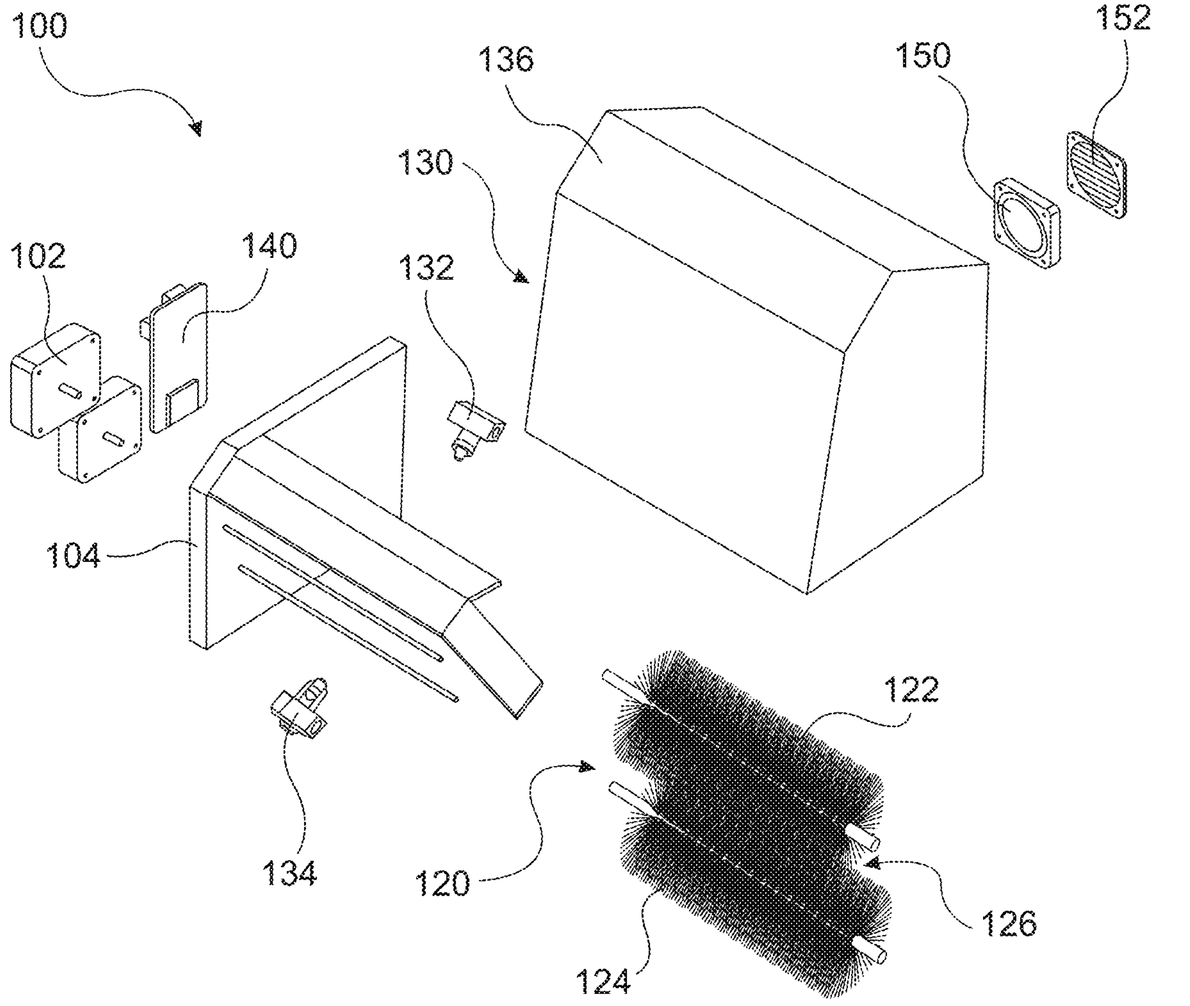
FIG. 4 is an exploded view of internal components of the hair clipper cleaning and disinfecting apparatus, in accordance with an embodiment of the present disclosure.

Referring to FIGS. 1 and 4, the apparatus 100 includes a cleaning member assembly 120 positioned within the housing 110. The cleaning member assembly 120 is configured to perform a cleaning action on the blade assembly, for example the plurality of teeth, of the hair clipper 10 to remove any debris or contaminants. As shown in FIG. 4, the cleaning member assembly 120 includes a first cleaning member 122 and a second cleaning member 124. The first cleaning member 122 is arranged above the second cleaning member 124 to define a receiving space 126 between the first and second cleaning members 122, 124 within the housing 110. In an embodiment, the first cleaning member 122 and the second cleaning member 124 are a first rotatable brush 122 and a second rotatable brush 124, respectively. The first rotatable brush 122 is arranged above the second rotatable brush 124 to define the receiving space 126 therebetween. The receiving space 126 is configured to accommodate a portion of the blade assembly, for example the plurality of teeth, of the hair clipper 10.

In accordance with the present disclosure, the first and second cleaning members 122, 124 are configured to move to contact opposing surfaces of the blade assembly within the receiving space 126 to dislodge contaminants during the cleaning and disinfecting operation. In an embodiment, the first and second cleaning members 122, 124, i.e., the first and second rotatable brushes 122, 124, are configured to press against the plurality of teeth of the blade assembly and adapted to be rotated by a motor 102 to clean the blade assembly of the hair clipper 10. The motor 102 may have two output ends, each of which is connected to the respective cleaning member amongst the first and second cleaning members 122, 124, for rotating the first and second cleaning members 122, 124. In an embodiment, the first cleaning member 122 (or the first rotatable brush 122) is configured to rotate in a direction opposite to a rotation direction of the second cleaning member 124 (or the second rotatable brush 124).

In an embodiment, when the blade assembly is received within the receiving space 126, the first cleaning member 122 is positioned to press against or contact an upper surface of the blade assembly, and the second cleaning member 124 is positioned to press against or contact a lower surface of the blade assembly. Further, the first and second cleaning members 122, 124 are configured to dislodge contaminants from the respective upper and lower surfaces of the blade assembly of the hair clipper 10, during the cleaning and disinfecting operation. In a further embodiment, the first cleaning member 122 and the second cleaning member 124 are configured to move toward one another upon receiving the blade assembly within the receiving space 126, such that the first and second cleaning members 122, 126 apply pressure against respective upper and lower surfaces of the blade assembly of the hair clipper 10. In some embodiment, the first and second cleaning members 122, 124 (for example, bristles of the first and second rotatable brushes 122, 124) may have a coating of antibacterial material.

Further, still referring to FIGS. 1 and 4, the apparatus 100 includes a disinfectant dispensing assembly 130 positioned within the housing 110. The disinfectant dispensing assembly 130 is configured to dispense a disinfectant solution towards the receiving space 126 between the first and second cleaning members 122, 124 to disinfect the blade assembly of the hair clipper 10. The disinfectant dispensing assembly 130 may comprise a set of nozzles for dispensing the disinfectant solution. In an embodiment, the disinfectant dispensing assembly 130 includes a first nozzle 132 and a second nozzle 134, as shown in FIG. 4.

Referring to FIG. 4, the first nozzle 132 may be configured to direct the disinfectant solution into the receiving space 126 from a first direction, and the second nozzle 134 may be configured to direct the disinfectant solution into the receiving space 126 from a second direction. The second direction may be different from the first direction. Without limiting the scope of protection of the present disclosure, in an embodiment, when the blade assembly is received within the receiving space 126, the first nozzle 132 is positioned above the blade assembly (or the plurality of teeth), and the second nozzle 134 is positioned below the blade assembly. The first nozzle 132 is configured to direct the disinfectant solution onto the upper surface of the blade assembly of the hair clipper 10, and the second nozzle 134 is configured to direct the disinfectant solution onto the lower surface of the blade assembly of the hair clipper 10.

Still referring to FIG. 4, the disinfectant dispensing assembly 130 further includes a reservoir 136 in fluid communication with the first and second nozzles 132, 134. The reservoir 136 is configured to store the disinfectant solution that is dispensed by the first and second nozzles 132, 134 of the disinfectant dispensing assembly 130. Without any limitation, the disinfectant solution may be 70% IPA (isopropyl alcohol) and 30% water, said solution is rapidly antimicrobial against bacteria, fungi, and viruses and disinfects the surfaces in less than 2 minutes, 1 minute, 30 seconds, or within 10 to 30 seconds.

Referring to FIG. 4, the apparatus 100 may comprise a mounting plate 104 provided within the housing 110 of the apparatus 100. The mounting plate 104 may facilitate mounting the cleaning member assembly 120, the disinfectant dispensing assembly 130 and/or the motor 102 within the housing 110. Further, as shown in FIG. 3, the housing 110 may be formed of two parts, which includes the body portion 112 and a tray 114 that is removably coupled to the body portion 112. The body portion 112 may define the opening 118 that facilitates insertion of at least the blade assembly of the hair clipper 10 within the housing 110. The tray 114 may be disposed below the body portion 112 and may be adapted to be slidably removable from under the body portion 112 of the housing 110. The tray 114 may facilitate collecting the debris or contaminants or any fluids released during the cleaning and disinfecting operation. Said debris or contaminants or any fluids may then be discarded upon removing the tray 114 from under the body portion 112 of the housing 110.

The apparatus 100 furthermore includes a control unit 140, as shown in FIG. 4. The control unit 140 may be operatively coupled to the cleaning member assembly 120 and the disinfectant dispensing assembly 130. The control unit 140 is configured to control operations of the cleaning member assembly 120 and the disinfectant dispensing assembly 130, including selectively releasing the disinfectant solution through the first and second nozzles 132, 134 and coordinating timing and movement of the cleaning member assembly 120. The control unit 140 may comprise a processor electronically coupled to a memory and operatively coupled to the cleaning member assembly 120, the disinfectant dispensing assembly 130 and the motor 102. The processor may facilitate controlling one or more operations of the cleaning member assembly 120, the disinfectant dispensing assembly 130 and the motor 102, through the control unit 140. The processor may be implemented as one or more microprocessors, microcomputers, microcontrollers, digital signal processors, central processing units, state machines, logic circuitries, and/or any devices that manipulate one or more signals based on operational instructions. Among other capabilities, the processor may be configured to fetch and execute computer-readable instructions stored in the memory associated with the corresponding control unit 140 or control functions of the cleaning member assembly 120, the disinfectant dispensing assembly 130 and the motor 102. In an embodiment, the control unit 140 may also be mounted on the mounting plate 104.

Referring to FIG. 1, in an embodiment, the apparatus 100 may comprise an actuating button 106 provided on the housing 110 of the housing 100. While FIG. 1 illustrates the actuating button 106 being provided on a front top portion of the housing 110, without deviating from the scope of protection of the present disclosure, in other embodiment, the actuating button 106 may be provided on other portions of the housing 110, for example, side or rear portions of the housing 110.

Upon actuation of the actuating button 106, by a user, the control unit 140 is configured to perform a cleaning and disinfecting sequence on the blade assembly, for example the plurality of teeth, of the hair clipper 10. The cleaning and disinfecting sequence may comprise activation of the cleaning member assembly 120. Upon activation of the cleaning member assembly 120, the first cleaning member 122 and the second cleaning member 124 move toward one another within the receiving space 126, such that the first and second cleaning members 122, 124 apply pressure against respective upper and lower surfaces of the blade assembly of the hair clipper 10. Further, upon said activation, the control unit 140 may transmit a first signal to the motor 102 for rotating the first cleaning member 122 and the second cleaning member 124 (for example, the first and second rotatable brushes 122, 124) for cleaning the blade assembly of the hair clipper 10. In an embodiment, the control unit 140 may cause activation of the cleaning member assembly 120 for a first interval to dislodge contaminants from the blade assembly of the hair clipper 10. Without limiting the scope of protection of the present disclosure, the first interval may range from 3 to 10 seconds.

Further, the cleaning and disinfecting sequence may comprise release of the disinfectant solution from the set of nozzles 132, 134 of the disinfectant dispensing assembly 130. In an embodiment, the cleaning and disinfecting sequence may comprise release of the disinfectant solution through the first and second nozzles 132, 134 onto the upper surface and the lower surface of the blade assembly of the hair clipper 10. In an exemplary embodiment, the release of the disinfectant solution through the first and second nozzles 132, 134 onto the upper surface and the lower surface of the blade assembly may be performed following the first interval.

Furthermore, the cleaning and disinfecting sequence may include continued operation of the cleaning member assembly 120 to distribute the disinfectant solution across the upper and lower surfaces of the blade assembly of the hair clipper 10. In an exemplary embodiment, the cleaning and disinfecting sequence may comprise causing continued operation of the first and second cleaning members 122, 124 for a second interval to distribute the disinfectant solution across the upper and lower surfaces of the blade assembly of the hair clipper 10. Without limiting the scope of protection of the present disclosure, the second interval may range from 3 to 10 seconds.

In an embodiment, the cleaning and disinfecting sequence may further include cessation of both the cleaning member assembly 120 and the disinfectant dispensing assembly 130 upon completion of the second interval. For example, the control unit 140 may transmit a second signal to the motor 102 to stop rotation of the first and second cleaning members 122, 124.

In accordance with the present disclosure, in some embodiment, wherein the control unit 140 is configured to sequentially rotate the first and second cleaning members 122, 124 and dispense the disinfectant solution from the first and second nozzles 132, 134 of the disinfectant dispensing assembly 130.

Within the scope of the present disclosure, in an embodiment, the control unit 140 may be configured to receive sensor input from one or more sensors positioned to detect levels and types of contaminants on the blade assembly of the hair clipper 10. The control unit 140 may further analyze the sensor input to assess a degree of contamination present on the upper and lower surfaces of the blade assembly. Based on the degree of contamination on the blade assembly, the control unit 140 may dynamically adjust a duration of the first interval for an operation of the cleaning member assembly 120. Further, the control unit 140 may determine and control a volume of disinfectant solution dispensed through the first and second nozzles 132, 134 based on the type and degree of contaminants on the blade assembly. The control unit 140 may further adjust a duration of the second interval for an operation of the cleaning member assembly 120 based on the type and degree of contaminants and the volume of disinfectant solution across the upper and lower surfaces of the blade assembly.

Figure 2:
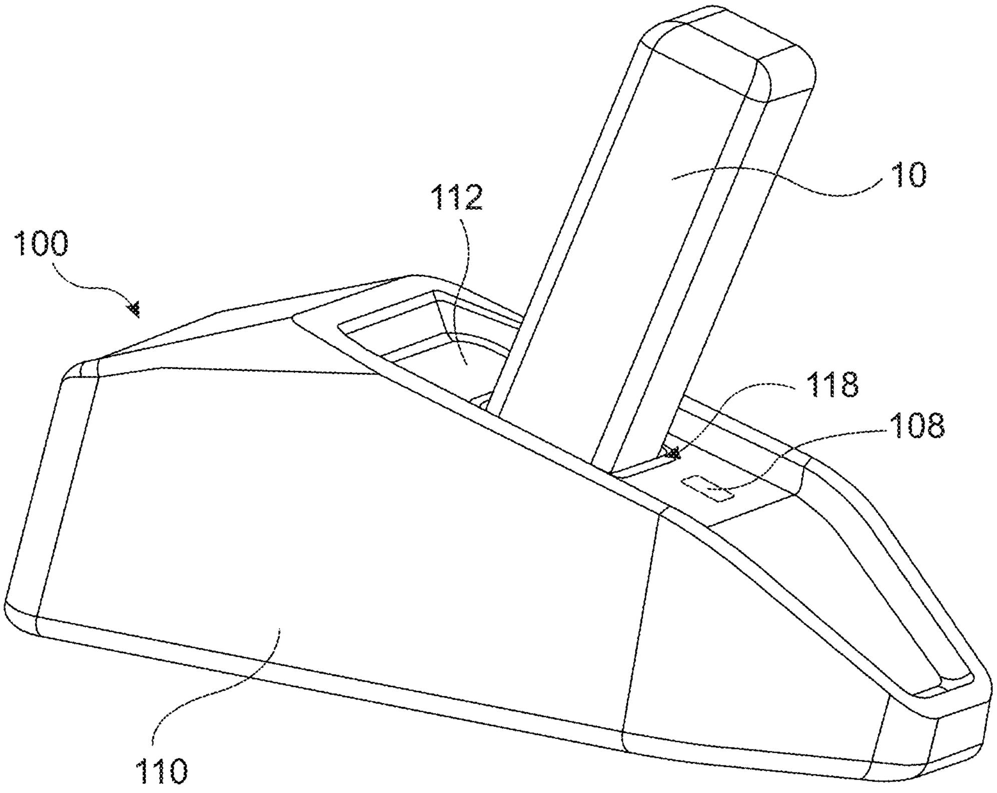
FIG. 2 is a perspective view of a hair clipper cleaning and disinfecting apparatus and a hair clipper, a portion of which is inserted into the hair clipper cleaning and disinfecting apparatus, in accordance with another embodiment of the present disclosure.

Referring to FIG. 2, in another embodiment, the apparatus 100 may comprise a sensor 108 positioned on the housing 110. The sensor 108 may be configured to detect the insertion of at least the blade assembly of the hair clipper 10 into the housing 110. In particular, the sensor 108 may be configured to detect insertion of at least the blade assembly of the hair clipper 10 into the opening 118 defined in the body portion 112 of the housing 110. Further, the sensor 108 may be communicatively coupled to the control unit 140. In accordance with the present disclosure, in said embodiment, the sensor 108 may transmit an input signal to the control unit 140 corresponding to the detection of insertion of the at least the blade assembly into the housing 110. Upon receiving the input signal from the sensor 108, the control unit 140 is configured to initiate one or more cleaning and disinfecting operations on the blade assembly of the hair clipper 10. In an embodiment, upon receiving the input signal from the sensor 108, the control unit 140 is configured to perform the above-described cleaning and disinfecting sequence on the blade assembly, for example the plurality of teeth, of the hair clipper 10.

The apparatus 100 of the present disclosure may further comprise a light emitting diode (LED) (not shown). The light emitting diode may be provided within or on the housing 110 of the apparatus 100 and may be communicatively coupled to the control unit 140. The light emitting diode may be configured to provide visual notification of one or more operations of the apparatus 100. For example, the light emitting diode may be configured to provide a visual notification of the actuation of the button 106, an ongoing cleaning and disinfecting sequence, a completion of the cleaning and disinfecting sequence, and/or to indicate change of stages in the cleaning and disinfecting sequence. For example, the light emitting diode may provide a blue light before the cleaning and disinfecting sequence, a green light when the apparatus is activated and the cleaning and disinfecting sequence is ongoing, and finally, a blue light when the cleaning and disinfecting sequence is completed. Further, in an embodiment, the apparatus 100 may comprise a display panel (not shown) provided on the housing 110 and configured to display one or more operations and/or operational parameters of the apparatus 100. The operational parameters may comprise an amount of disinfectant solution which remains in the reservoir 136, stage in the cleaning and disinfecting sequence, completion of the cleaning and disinfecting sequence, power failure, need to empty the tray 114, etc.

Further, the apparatus 100 may comprise an ultraviolet (UV) light source (not shown) positioned within the housing 110. The ultraviolet light source is configured to emit ultraviolet (UV) light to disinfect interior surfaces of the apparatus 100. In accordance with the present disclosure, the ultraviolet light source is operatively coupled to the control unit 140. The control unit 140 is configured to activate the ultraviolet light source for emitting the ultraviolet light upon completion of the cleaning and disinfecting sequence and removal of the hair clipper 10 from the apparatus 100. In accordance with the present disclosure, in an embodiment, the ultraviolet light source is configured to emit the ultraviolet light when the apparatus 100 is fully closed having no hair clipper 10 in the housing 110 of the apparatus 100.

In some embodiments, the apparatus 100 may comprise a charging port provided on the housing 110. The charging port may facilitate charging of equipment of the apparatus 100, by way of a charging cable. For example, the charging port may facilitate charging of one or more batteries associated with components/assemblies of the apparatus 100. Further, the charging port facilitates providing power, by way of the charging cable, to the motor 102 of the apparatus 100. The apparatus 100 may be powered by a standard 5.5 mm direct current (DC) Barrel Plug.

Further, as shown in FIG. 4, the apparatus 100 may include an exhaust fan 150 provided in the body portion 112 of the housing 110. The exhaust fan 150 is operatively coupled to the control unit 140 and the control unit 140 may be configured to activate the exhaust fan 150 during the cleaning and disinfecting sequence to promote a dry interior of the apparatus 100 during and after use. The exhaust fan 150 may facilitate reducing moisture buildup, providing ventilation and expelling the debris or contaminants during and/or after the cleaning and disinfecting sequence. The exhaust fan 150 may work in cooperation with an absorbent surface within the housing 110 to collect moisture and reduce excess moisture from the blade assembly of the hair clipper 10. The apparatus 100 may further include a cover 152 having a mesh provided to cover the exhaust fan 150.

The apparatus 100 of the present disclosure may be used for hair cutting in human and non-human animals. The apparatus 100 may be used for professional or commercial use and personal or private use. The apparatus 100 may be used in the hair industry by professional barbers and cosmetologists for grooming or by health care professionals in the medical field for humans of all ages. The apparatus 100 may also be used in the pet grooming industry for dogs, cats, hamsters and gerbils, mice and rats, rabbits, chinchillas, guinea pigs, ferrets, etc. The apparatus 100 can also be used in the livestock, for example, cattle, sheep, goats, alpaca, camels, etc., and for equine grooming industry, for example horses and zebras. The apparatus 100 can also be used for such domestic and livestock animals for veterinary purposes.

Figure 5:
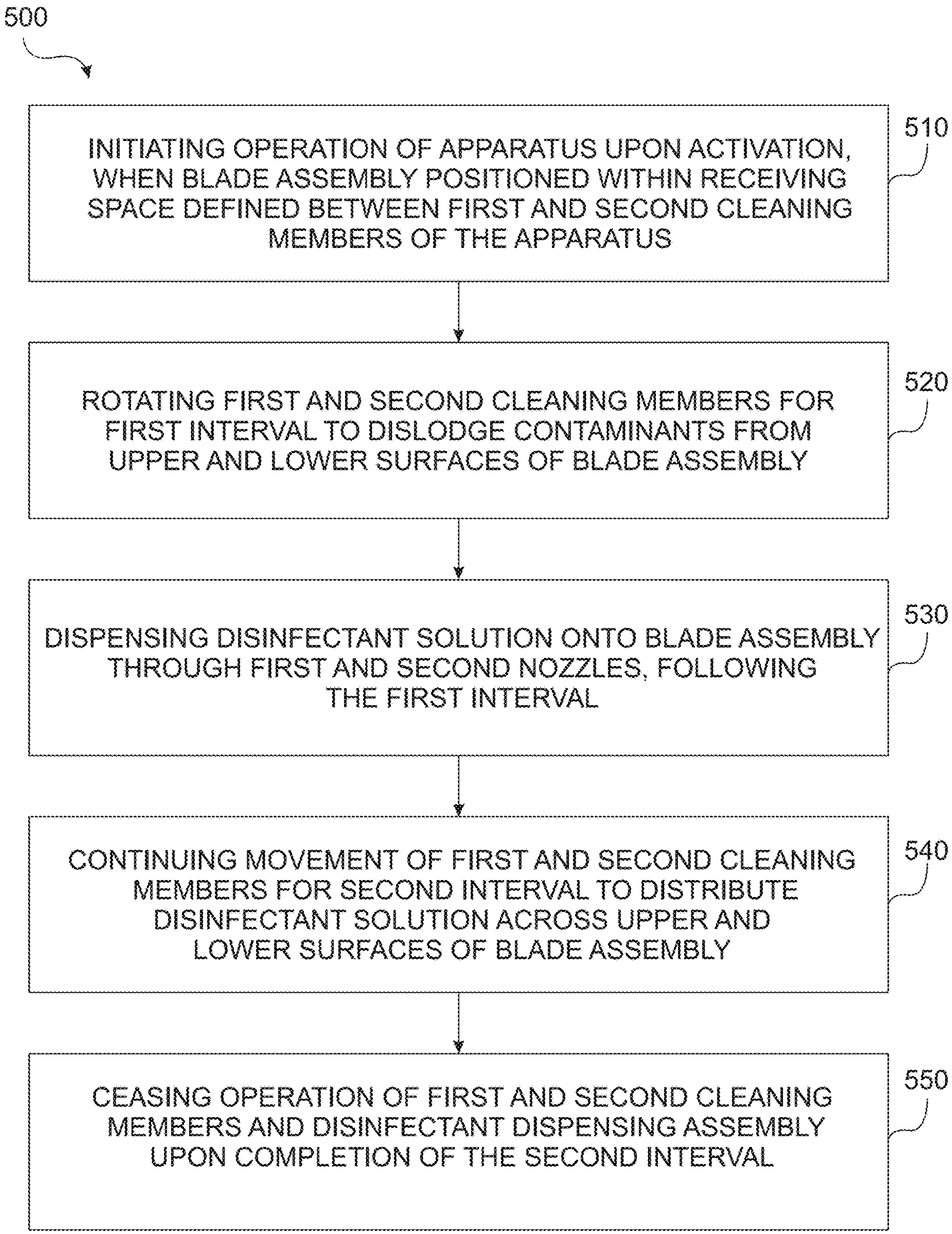
FIG. 5 depicts a flow chart for a method of cleaning and disinfecting the hair clipper using the hair clipper cleaning and disinfecting apparatus, in accordance with an embodiment of the present disclosure.

Referring to FIG. 5, a method 500 of cleaning and disinfecting the blade assembly of the hair clipper 10 using the cleaning and disinfecting apparatus 100 (the apparatus 100) is disclosed. At step 510, the method 500 includes initiating operation of the apparatus 100 upon activation, when the blade assembly of the hair clipper 10 is positioned within the receiving space 126. The receiving space 126 being defined between the first cleaning member 122 and the second cleaning member 124 of the cleaning member assembly 120 of the apparatus 100. In an embodiment, the step 510 of initiating operation of the apparatus 100 may be performed upon actuation of the actuating button 106 provided on the housing 110. In another embodiment, the step 510 of initiating operation of the apparatus 110 may be performed when the control unit 140 receives the input signal from the sensor 108 provided on the housing 110. Upon initiation of the operation, the first and second cleaning members 122, 124 contact respective upper and lower surfaces of the blade assembly of the hair clipper 10.

At step 520, the method 500 further includes rotating the first and second cleaning members 122, 124 for the first interval to dislodge contaminants from the upper and lower surfaces of the blade assembly of the hair clipper 10. In an embodiment, rotating the first and second cleaning members 122, 124 may comprise transmitting the first signal, by the control unit 140, to the motor 102 for rotating the first cleaning member 122 and the second cleaning member 124 (for example, the first and second rotatable brushes 122, 124) for cleaning the upper and lower surfaces of the blade assembly to dislodge contaminants from the blade assembly. The first interval may range from a time period of less than about one minute, and such as from about 3 to 10 seconds.

Further, at step 530, the method 500 includes dispensing the disinfectant solution onto the blade assembly through the first nozzle 132 positioned to direct the disinfectant solution onto the upper surface of the blade assembly and through the second nozzle 134 positioned to direct the disinfectant solution onto the lower surface of the blade assembly following the first interval. At step 540, the method 500 includes continuing movement of the first and second cleaning members 122, 124 for the second interval to distribute the disinfectant solution across the upper and lower surfaces of the blade assembly of the hair clipper 10. The second interval may range from a time period of less than about one minute, and such as from about 3 to 10 seconds.

Furthermore, at step 550, the method 500 includes ceasing operation of the first and second cleaning members 122, 124 and the disinfectant dispensing assembly 130 upon completion of the second interval. In an embodiment, ceasing operation including transmitting the second signal, from the control unit 140, to the motor 102 to stop rotation of the first and second cleaning members 122, 124.

In accordance with the present disclosure, the apparatus 100 and the system of the present disclosure are automatic hands-free apparatus and system for thoroughly cleaning and disinfecting the hair clipper 10 in about 10 seconds. Further, the apparatus 100, the system and the method 500 of the present disclosure aid in preventing the spread of disease-causing bacteria and fungi which cause ringworm, folliculitis and several other skin infections many of which cause permanent damage to the skin, and preventing the spread of deadly viral blood borne pathogens which are the source of HIV, MRSA and Hepatitis B and C.

Furthermore, the apparatus 100, the system and the method 500 of the present disclosure automates the cleaning and disinfecting process and eliminates the time and the manual effort used for thorough and proper cleaning. Also, the cleaning and disinfecting sequence exceeds Barber and Cosmetology Health and Safety regulations, ensuring legal compliance and peace of mind for professionals and their clients.

The various embodiments of the present disclosure have been described above with reference to the accompanying drawings. The present disclosure is not limited to the illustrated embodiments; rather, these embodiments are intended to fully and completely disclose the subject matter of the present disclosure to those skilled in this art. In the drawings, like numbers refer to like elements throughout.

While considerable emphasis has been placed herein on the particular features of this present disclosure, it will be appreciated that various modifications can be made, and that many changes can be made in the various embodiments without departing from the principles of the present disclosure. These and other modifications in the nature of the present disclosure or the various embodiments will be apparent to those skilled in the art from the present disclosure herein, whereby it is to be distinctly understood that the foregoing descriptive matter is to be interpreted merely as illustrative of the present disclosure and not as a limitation.

What is claimed is:

1. A hair clipper cleaning and/or disinfecting apparatus, comprising:

(a) a housing configured to receive and at least partially enclose a blade assembly of a hair clipper during an automated cleaning and disinfecting operation, wherein the blade assembly comprises a plurality of teeth for shearing hair of a preselected or variable length;

(b) a cleaning member assembly positioned within the housing, the cleaning member assembly comprising a first cleaning member and a second cleaning member arranged to define a receiving space between them within the housing, the receiving space configured to accommodate a portion of the blade assembly, wherein the first and second cleaning members are configured to move to contact opposing surfaces of the blade assembly within the receiving space to dislodge contaminants during the automated cleaning and disinfecting operation, wherein:

the first cleaning member is positioned to contact an upper surface of the blade assembly when the blade assembly is received within the receiving space defined by the first and second cleaning members; and the second cleaning member is positioned to contact a lower surface of the blade assembly when the blade assembly is received within the receiving space, the first cleaning member and the second cleaning member are configured to dislodge contaminants from the respective upper and lower surfaces of the blade assembly during the automated cleaning and disinfecting operation;

(c) a disinfectant dispensing assembly positioned within the housing, the disinfectant dispensing assembly comprising:

a first nozzle configured to direct a disinfectant solution into the receiving space from a first direction, a second nozzle configured to direct the disinfectant solution into the receiving space from a second direction that is different from the first direction, and a reservoir in fluid communication with the first and second nozzles, the reservoir configured to store the disinfectant solution; and (d) a control unit operatively coupled to the cleaning member assembly and the disinfectant dispensing assembly, wherein the control unit is configured to control operations of the cleaning member assembly and the disinfectant dispensing assembly, including selectively releasing the disinfectant solution through the first and second nozzles and coordinating timing and movement of the cleaning member assembly, wherein the control unit is further configured to perform a cleaning and disinfecting sequence comprising:

cause activation of the cleaning member assembly for a first interval to dislodge contaminants from the blade assembly;

cause release of the disinfectant solution through the first and second nozzles onto the upper surface and the lower surface of the blade assembly following the first interval;

cause continued operation of the cleaning member assembly for a second interval to further distribute the disinfectant solution across the upper and lower surfaces of the blade assembly; and cause cessation of both the cleaning member assembly and the disinfectant dispensing assembly upon completion of the second interval, wherein the control unit is further configured to:

receive a sensor input from one or more sensors positioned to detect levels and types of contaminants on the blade assembly;

analyze the sensor input to assess a degree of contamination present on the upper and lower surfaces of the blade assembly;

dynamically adjust a duration of the first interval for an operation of the cleaning member assembly based on the degree of contamination;

determine and control a volume of disinfectant solution dispensed through the first and second nozzles based on the type and degree of contaminants; and adjust a duration of the second interval for an operation of the cleaning member assembly operation based on the type and degree of contaminants and the volume of disinfectant solution across the upper and lower surfaces of the blade assembly.

2. The apparatus of claim 1, wherein when the blade assembly is received within the receiving space:

the first nozzle is configured to direct the disinfectant solution onto the upper surface of the blade assembly; and the second nozzle configured to direct the disinfectant solution onto the lower surface of the blade assembly.

3. The apparatus of claim 2, wherein when the blade assembly is received within the receiving space, the first nozzle is positioned above the blade assembly, and the second nozzle is positioned below the blade assembly.

4. The apparatus of claim 1, wherein the first interval ranges from 3 to 10 seconds, and wherein the second interval ranges from 3 to 10 seconds.

5. The apparatus of claim 1, wherein the first cleaning member and the second cleaning member are configured to move toward one another upon receiving the blade assembly within the receiving space, such that each cleaning member applies pressure against respective upper and lower surfaces of the blade assembly.

6. The apparatus of claim 1, wherein the control unit is configured to:

receive a user input, by actuation of a button, for cleaning and disinfecting the blade assembly of the hair clipper; and upon receiving the user input:

transmit a first signal to a motor for rotating the first cleaning member and the second cleaning member for cleaning the blade assembly of the hair clipper; and dispense the disinfectant solution, by the first and second nozzles, to disinfect the blade assembly of the hair clipper.

7. The apparatus of claim 1, wherein the control unit is configured to sequentially rotate the first and second cleaning members and dispense the disinfectant solution from the first and second nozzles.

8. The apparatus of claim 1, wherein at least one of the first cleaning member or the second cleaning member is a rotatable brush.

9. The apparatus of claim 1, wherein the first and second cleaning members are rotatable brushes.

10. The apparatus of claim 1, further comprising a light emitting element configured to provide a visual notification of an ongoing cleaning and disinfection operation.

11. The apparatus of claim 1, further comprising an ultraviolet light source positioned within the housing and configured to emit UV light to disinfect interior surfaces of the apparatus.

12. The apparatus of claim 11, wherein the ultraviolet light source is operatively coupled to the control unit, the control unit being configured to activate the ultraviolet light source upon completion of the cleaning and disinfecting operation and removal of the hair clipper from the apparatus.

13. The apparatus of claim 1, comprising a sensor positioned on the housing and configured to detect insertion of at least the blade assembly of the hair clipper into the housing, wherein the control unit is communicatively coupled to the sensor, the control unit configured to initiate one or more cleaning operations upon receiving an input signal from the sensor.

14. The apparatus of claim 1, wherein the first cleaning member is configured to rotate in a direction opposite to a rotation direction of the second cleaning member.

15. A method of cleaning and disinfecting a blade assembly of a hair clipper using a cleaning and disinfecting apparatus of claim 1.

16. The method of claim 15, wherein, when the blade assembly is positioned within the receiving space, the first and second cleaning members move toward one another to close on the blade assembly, contacting respective upper and lower surfaces of the blade assembly.

* * * * *